US012677109B2

(12) United States Patent
McLachlan et al.

(10) Patent No.: US 12,677,109 B2
(45) Date of Patent: Jul. 7, 2026

(54) METHODS AND DEVICES RELATED TO EXTENDED REALITY

(71) Applicant: Telefonaktiebolaget LM Ericsson (publ), Stockholm (SE)

(72) Inventors: Paul McLachlan, San Francisco, CA (US); Lauren Ann Gilbert, La Jolla, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 306 days.

(21) Appl. No.: 18/289,497

(22) PCT Filed: May 5, 2021

(86) PCT No.: PCT/EP2021/061811
§ 371 (c)(1),
(2) Date: Nov. 3, 2023

(87) PCT Pub. No.: WO2022/233405
PCT Pub. Date: Nov. 10, 2022

(65) Prior Publication Data
US 2024/0244392 A1     Jul. 18, 2024

(51) Int. Cl.
*H04W 4/02* (2018.01)

(52) U.S. Cl.
CPC ..................................... *H04W 4/02* (2013.01)

(58) Field of Classification Search
CPC ....... H04W 4/02; H04W 4/029; H04W 64/00; H04W 88/02; H04W 8/24; H04W 8/005; H04W 84/18; H04W 12/63; H04W 24/02; H04W 68/04; H04W 8/26; H04W 76/11; H04W 92/18; H04W 8/22; H04W 8/12; G06F 3/011; G06F 3/0346; H04L 67/10
See application file for complete search history.

(56) References Cited

U.S. PATENT DOCUMENTS

| | | | |
|---|---|---|---|
| 8,583,668 B2 | 11/2013 | Higgins et al. | |
| 2006/0094426 A1* | 5/2006 | Donaho | ................ H04W 84/18 |
| | | | 455/434 |
| 2013/0117377 A1 | 5/2013 | Miller | |
| 2015/0310279 A1 | 10/2015 | Bare et al. | |
| 2016/0105780 A1* | 4/2016 | Hooker | ................ H04W 64/00 |

(Continued)

OTHER PUBLICATIONS

International Search Report and Written Opinion issued in International Application No. PCT/EP2021/061811 issued on Jan. 26, 2022 (13 pages).

(Continued)

*Primary Examiner* — Lana N Le
(74) *Attorney, Agent, or Firm* — Rothwell, Figg, Ernst & Manbeck, P.C.

(57) ABSTRACT

A method (700) for collaborative spatial mapping. The method may be performed by a requesting device. The method includes generating an object map request for object information for a location, the object map request comprising a location identifier identifying the location and object type information specifying an object type. The method also includes transmitting the object map request. The method also includes receiving a response to the object map request, the response comprising object information about an identified object of the specified object type.

7 Claims, 11 Drawing Sheets

900 s902
receiving a first request generated by a requesting device, the first request comprising a location identifier identifying a location and object type information specifying an object type s904
after receiving the first request, transmitting a second request to a responding device s906
receiving a first response transmitted by the responding device in response to the second request, the first response comprising information pertaining to the identified location obtained by the responding device s908
transmitting to the requesting device a second response in response to receiving the first response transmitted by the responding device, wherein the second response comprises one or more of: i) the information obtained by the responding device or ii) information generated by the network node using the information obtained by the responding device

(56)                    References Cited

U.S. PATENT DOCUMENTS

| | | | |
|---|---|---|---|
| 2020/0357284 A1 | 11/2020 | Sutou et al. | |
| 2023/0196693 A1* | 6/2023 | Stoski .................. | G06F 3/0346 |
| 2024/0121616 A1* | 4/2024 | Lee ........................ | H04W 4/02 |
| 2024/0331310 A1* | 10/2024 | Shrivastava ............ | G06F 3/011 |

OTHER PUBLICATIONS

Zhou, Y. et al., "VoxelNet: End-to-End Learning for Point Cloud Based 3D Object Detection", Nov. 17, 2017 (10 pages).

Kwon, S. et al., "Smart Merging Method for Hybrid Point Cloud Data Using UAV and LIDAR in Earthwork Construction", Procedia Engineering 196 (2017) 21-28 (8 pages).

Werner, P. A., "Review of Implementation of Augmented Reality into the Georeferenced Analogue and Digital Maps and Images", Information 2019, 10, 12, (14 pages).

The Wayback Machine, "Mobility Devices Market Size, Share & Industry Analysis, By Product (Wheelchairs, Mobility Scooters, Walking Aids, and Others); By End-user (Personal Users and Institutional Users); and Regional Forecast, 2019-2026", https://web.archive.org/web/20210414191004/https://www.fortunebusinessinsights.com/industry-reports/mobility-devices-market-100520 (2023) (7 pages).

Kaye, H. S. et al., "Mobility Device Use in the United States. Disability Center.", Jun. 2000 (60 pages).

Ericsson, "10 Hot Consumer Trends 2030", Ericsson ConsumerLab Dec. 2019 (16 pages).

Reichherzer, C. et al., "[Poster] Social Panoramas Using Wearable Computers", IEEE 2014 (2 pages).

Shi, S. et al., "PointRCNN: 3D Object Proposal Generation and Detection from Point Cloud", May 16, 2019 (10 pages).

* cited by examiner

500

| 1. LAID | 2. Object Type ID | 3. Location Type ID | 4. Information Type ID | |
|---|---|---|---|---|
| 5. Response Privacy settings | 6. Sharing setting | | 7. Storage time | 8. Purpose |

700 s702

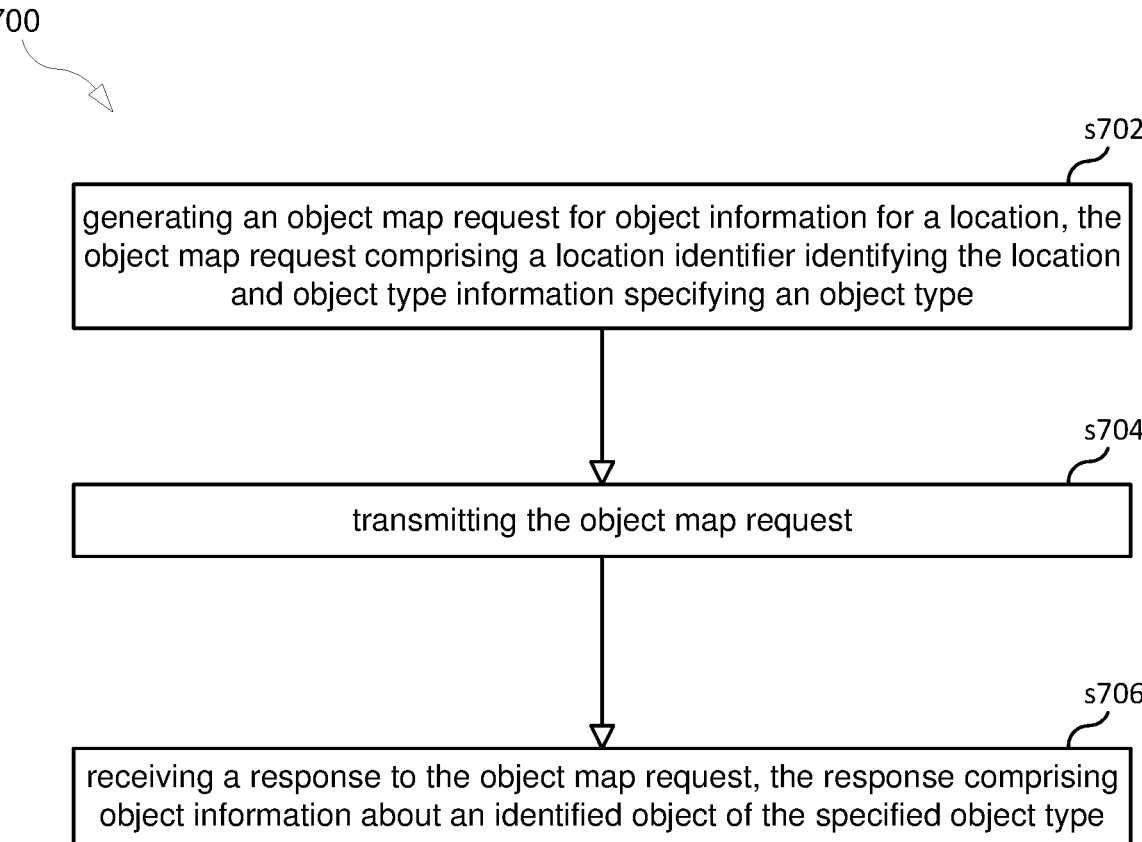

generating an object map request for object information for a location, the object map request comprising a location identifier identifying the location and object type information specifying an object type s704 transmitting the object map request s706 receiving a response to the object map request, the response comprising object information about an identified object of the specified object type

FIG. 7

800 s802 receiving, at a responding device, an object map request generated by a requesting device s804 obtaining information pertaining to a current location of the responding device s806 generating a response to the object map request, the response comprising the obtained information s808 transmitting the response to a network node

900

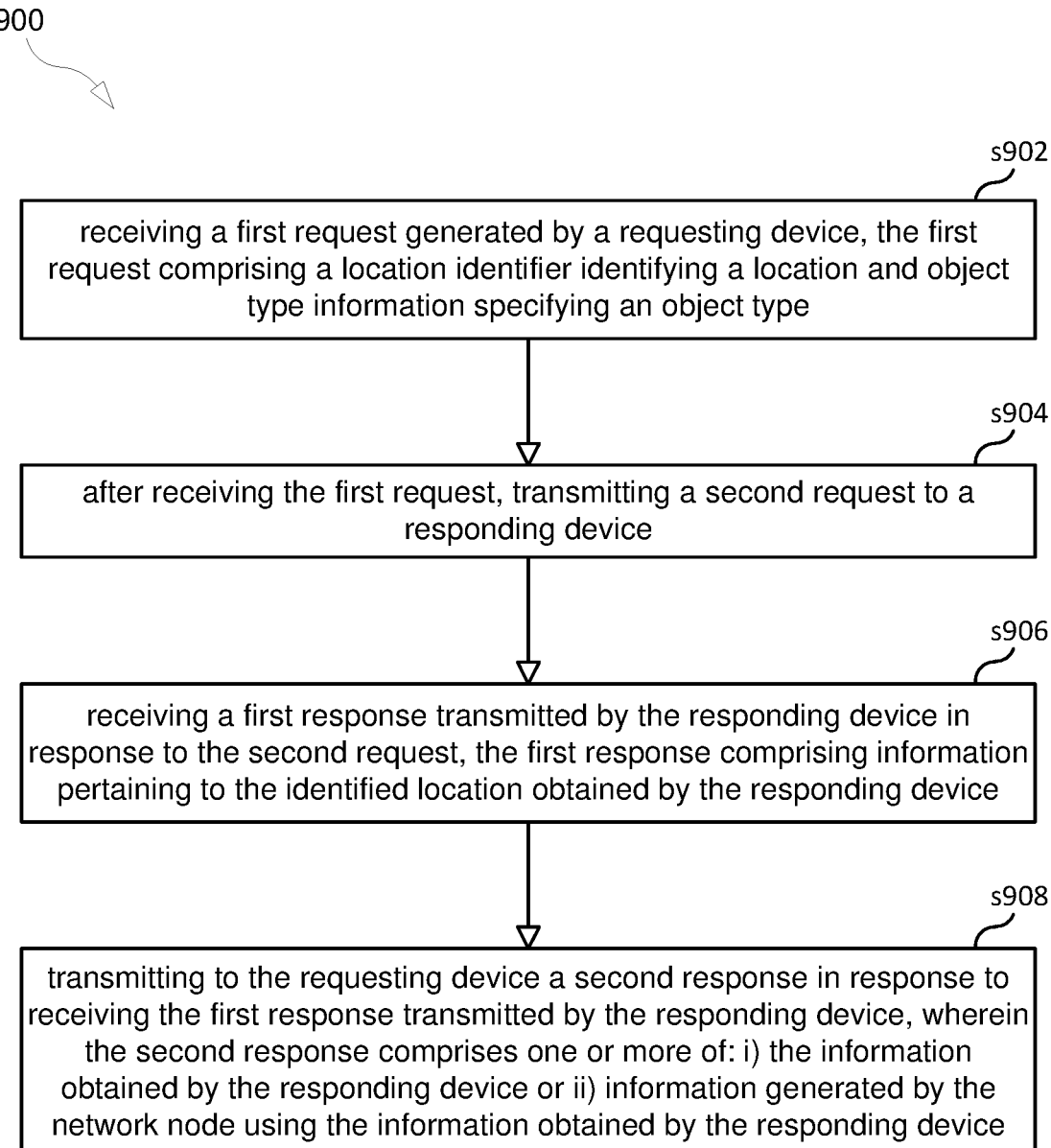

s902 receiving a first request generated by a requesting device, the first request comprising a location identifier identifying a location and object type information specifying an object type s904 after receiving the first request, transmitting a second request to a responding device s906 receiving a first response transmitted by the responding device in response to the second request, the first response comprising information pertaining to the identified location obtained by the responding device s908 transmitting to the requesting device a second response in response to receiving the first response transmitted by the responding device, wherein the second response comprises one or more of: i) the information obtained by the responding device or ii) information generated by the network node using the information obtained by the responding device

FIG. 9

METHODS AND DEVICES RELATED TO EXTENDED REALITY

CROSS REFERENCE TO RELATED APPLICATIONS

This application is a 35 U.S.C. § 371 National Stage of International Patent Application No. PCT/EP2021/061811, filed 2021 May 5.

TECHNICAL FIELD

This disclosure relates to an extended reality (XR) device and methods performed by the device, computer programs, and carriers.

BACKGROUND

Extended Reality

Extended reality (XR) uses computing technology to create simulated environments (a.k.a., XR environments or XR scenes). XR is an umbrella term encompassing virtual reality (VR) and real-and-virtual combined realities, such as augmented reality (AR) and mixed reality (MR). Accordingly, an XR system can provide a wide variety and vast number of levels in the reality-virtuality continuum of the perceived environment, bringing AR, VR, MR and other types of environments (e.g., mediated reality) under one term.

Augmented Reality (AR)

AR systems augment the real world and its physical objects by overlaying virtual content. This virtual content is often produced digitally and incorporates sound, graphics, and video. For instance, a shopper wearing AR glasses while shopping in a supermarket might see nutritional information for each object as they place the object in their shopping carpet. The glasses augment reality with additional information.

Virtual Reality (VR)

VR systems use digital technology to create an entirely simulated environment. Unlike AR, which augments reality, VR is intended to immerse users inside an entirely simulated experience. In a fully VR experience, all visuals and sounds are produced digitally and does not have any input from the user's actual physical environment. For instance, VR is increasingly integrated into manufacturing, whereby trainees practice building machinery before starting on the line. A VR system is disclosed in US 20130117377 A1.

Mixed Reality (MR)

MR combines elements of both AR and VR. In the same vein as AR, MR environments overlay digital effects on top of the user's physical environment. However, MR integrates additional, richer information about the user's physical environment such as depth, dimensionality, and surface textures. In MR environments, the user experience therefore more closely resembles the real world. To concretize this, consider two users hitting a MR tennis ball in on a real-world tennis court. MR will incorporate information about the hardness of the surface (grass versus clay), the direction and force the racket struck the ball, and the players' height.

XR User Device

An XR user device is an interface for the user to perceive both virtual and/or real content in the context of extended reality. An XR user device has one or more sensory actuators, where each sensory actuator is operable to produce one or more sensory stimulations. An example of a sensory actuator is a display that produces a visual stimulation for the user. A display of an XR user device may be used to display both the environment (real or virtual) and virtual content together (e.g., video see-through), or overlay virtual content through a semi-transparent display (e.g., optical see-through). The XR user device may also have one or more sensors for acquiring information about the user's environment (e.g., a camera, inertial sensors, etc.). Other examples of a sensory actuator include a haptic feedback device, a speaker that produces an aural stimulation for the user, an olfactory device for producing smells, etc.

Object Recognition

Object recognition in XR is mostly used to detect real world objects for triggering digital content. For example, the user may look at a fashion magazine with augmented reality glasses and a video of a catwalk event would play in a video for the user. Sound, smell, and touch are also considered objects subject to object recognition.

Spatial Mapping

XR is considered to be a transformative technology (see, e.g., Ericsson ConsumerLab, "10 Hot Consumer Trends 2030: The Internet of Senses," December 2019) available at: www.ericsson.com/4afb37/assets/local/reports-papers/con-sumerlab/reports/2019/10hctreport2019_screen_aw.pdf).
Most XR use cases are predicated upon the ability to digitize environments, such as street scenes or shopping centers, for purposes of content overlays and personalization. Existing processes use simultaneous localization and mapping (SLAM) algorithms to locate objects in three-dimensional space and generate maps that can be stored for future use. Researchers refer to the process that generates these maps as "spatial mapping." Once in an edge computing or cloud computing environment (hereinafter, "the edge-cloud"), other methods augment spatial maps with qualitative information about the objects and their environment. This qualitative information about the objects and their environment is referred to as semantic understanding data, and XR systems use it to create site and environmentally specific overlays, guidance, and media.
Most spatial mapping research focuses on methods to improve performance using data gathered by a user's XR headset. Notable topics include object detection, point cloud compression, and computational efficiency. For example, collaborative spatial mapping research focuses on allowing users to share extant spatial maps with other users or combine data from multiple headsets and perspectives to produce one spatial map (see, e.g., Kwon et. al., "Smart merging method for hybrid point cloud data using UAV and LIDAR in earthwork construction," Procedia engineering 2017 Jan. 1; 196:21-8).

SUMMARY

Certain challenges presently exist. For instance, although current methods of spatial mapping that require users to be physically present is reasonable for many use cases, it is computationally inefficient and poorly suited for, inter alia, route planning, location discovery, or object reclassification.

Accordingly, in one aspect there is provided a method for collaborative spatial mapping. The method may be performed by a requesting device. The method includes generating an object map request for object information for a location (e.g., a spatial map update), the object map request comprising a location identifier identifying the location and object type information specifying an object type. The method also includes transmitting the object map request. The method also includes receiving a response to the object map request (e.g., receiving a spatial map update), the response comprising object information about an identified object of the specified object type. In another aspect there is provided a computer program comprising instructions which when executed by processing circuitry of a requesting device causes the requesting device to perform the method. In another aspect there is provided a carrier containing the computer program, wherein the carrier is one of an electronic signal, an optical signal, a radio signal, and a computer readable storage medium. In another aspect there is provided a requesting device, where the requesting device is configured to perform the method. In some embodiments, the requesting device includes processing circuitry and a memory containing instructions executable by the processing circuitry, whereby the requesting device is configured to perform the method.

In another aspect there is provided a method for collaborative spatial mapping, where the method is performed by a responding device. The method includes receiving, at the responding device, an object map request generated by a requesting device. The method also includes obtaining information pertaining to a current location of the responding device. The method also includes generating a response to the object map request, the response comprising the obtained information. The method also includes transmitting the response to a network node. In another aspect there is provided a computer program comprising instructions which when executed by processing circuitry of a responding device causes the responding device to perform the method. In another aspect there is provided a carrier containing the computer program, wherein the carrier is one of an electronic signal, an optical signal, a radio signal, and a computer readable storage medium. In another aspect there is provided a responding device, where the responding device is configured to perform the method. In some embodiments, the responding device includes processing circuitry and a memory containing instructions executable by the processing circuitry, whereby the responding device is configured to perform the method.

In another aspect there is provided a method for collaborative spatial mapping, where the method is performed by a network node. The method includes receiving a first request message generated by a requesting device, the first request message comprising a location identifier identifying a location and object type information specifying an object type. The method also includes after receiving the first request message, transmitting a second request message to a responding device. The method also includes receiving a first response message transmitted by the responding device in response to the second request message, the first response message comprising information obtained by the responding device and pertaining to the identified location. The method also includes transmitting to the requesting device a second response message in response to receiving the first response message transmitted by the responding device. The second response message comprises one or more of: i) the information obtained by the responding device or ii) information generated by the network node using the information obtained by the responding device. In another aspect there is provided a computer program comprising instructions which when executed by processing circuitry of a network node causes the network node to perform the method. In another aspect there is provided a carrier containing the computer program, wherein the carrier is one of an electronic signal, an optical signal, a radio signal, and a computer readable storage medium. In another aspect there is provided a network node, where the network node is configured to perform the method. In some embodiments, the network node includes processing circuitry and a memory containing instructions executable by the processing circuitry, whereby the network node is configured to perform the method.

The embodiments disclosed herein are advantageous for numerous reasons. For example, current XR technology limits the requesting user to either publicly available information or information about the requesting user's current physical location, whereas embodiments disclosed herein expands the scope of spatial map information that may be accessed by a requesting user, allowing the requesting user to gain information about a location the requesting user is not currently in. For instance, a requesting user may desire to know if a path is currently blocked (for instance, if the environment changes daily, as with a road or path under construction) or the current crowding at a particular location. This can be used as an accessibility tool—people using access technology may wish to know if their path is clear at a particular moment—but is not limited to use for accessibility. For instance, an able-bodied individual might wish to confirm that a gathering is cleared before they take a particular route or a shopper wishing to avoid crowds might request information about the current stock level of a particular item.

The embodiments, moreover, are not limited to human use. It is critical for self-driving cars and drones to be able to react to dynamic environments, and this may be substantially improved if the drone or car is able to access information beyond its field of view. For instance, a drone may request the spatial map beyond a blind corner to avoid future collisions. This makes the use of such drones and/or self-driving cars more viable, as it improves their reliability and decreases likelihood of collisions with objects that are not yet within the line of sight.

In short, advantages of the embodiments disclosed herein include the following: dynamic map updates, scalability in terms of supporting multiple devices or requests for information at the same time, flexibility (e.g., object map requests and information can be transmitted by any type of network connected device and is not limited to a particular platform because the architecture is agnostic to input device), accessibility (e.g., a requesting user with accessibility needs often needs detailed near-real-time spatial information and the embodiments allow the requesting user to request such information, thereby allowing the requesting user to evaluate if a particular place meets the requesting user's accessibility needs, even when existing public spatial maps do not contain this information, and safety (e.g., providing a disabled requesting user with more accessibility information allows the requesting user to more safely transit the world as the requesting user will be able to know in advance if a particular route or location meets the requesting user's accessibility needs at the time when the requesting user is going there—e.g., it also allows requesting users and devices to see locations just beyond their visual field to safely navigate blind corners).

BRIEF DESCRIPTION OF THE DRAWINGS

The accompanying drawings, which are incorporated herein and form part of the specification, illustrate various embodiments.

FIG. 7 is a flowchart illustrating a process according to an embodiment.

FIG. 9 is a flowchart illustrating a process according to an embodiment.

DETAILED DESCRIPTION

Figure 1:
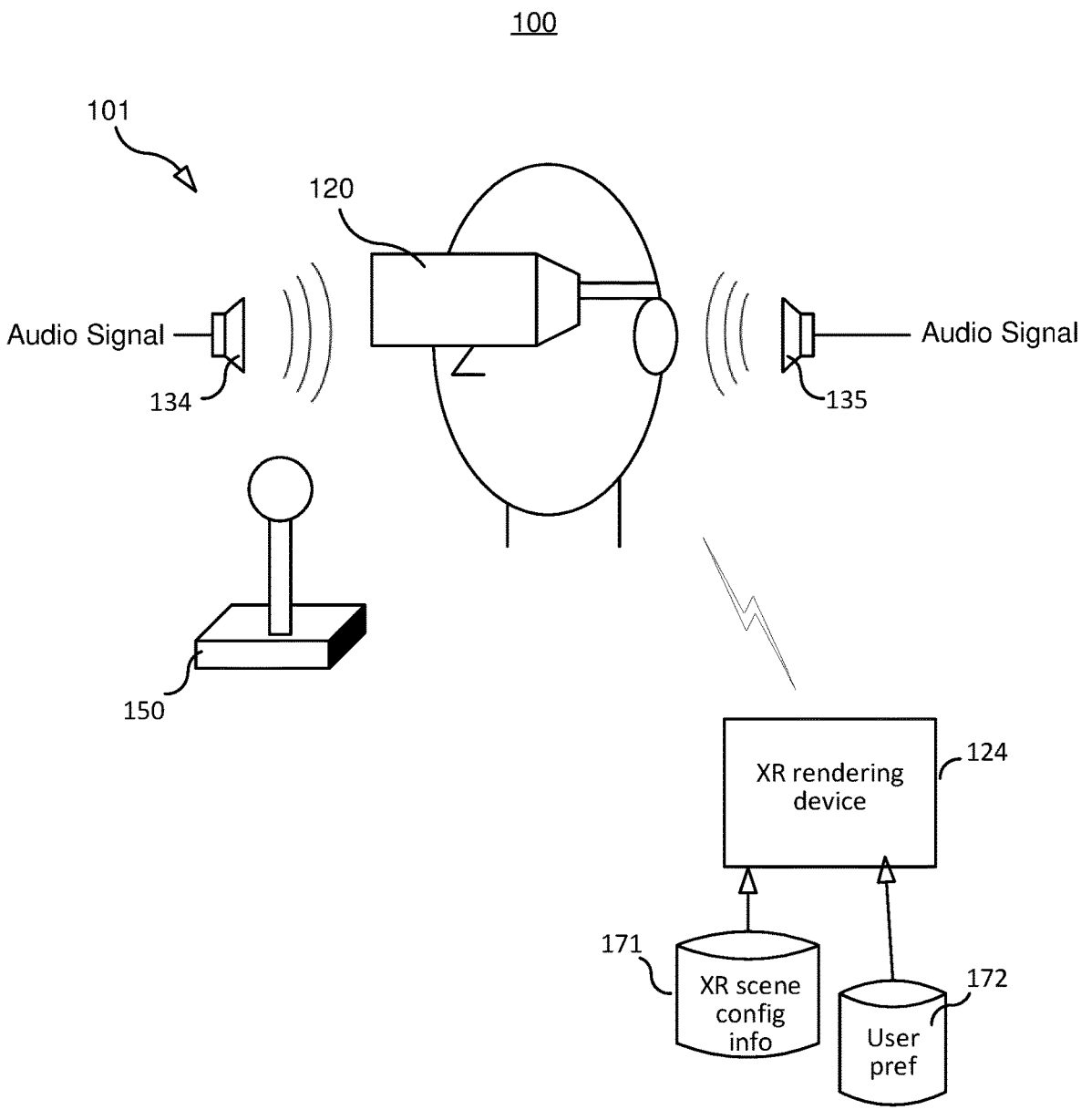
FIG. 1 illustrates an XR system according to an embodiment.

This disclosure describes a system that allows a requesting user to request and receive information from a responding device (e.g., a device being used by another user) for purposes of spatial mapping. A responding device can be any device that is able to obtain requested information (e.g., information about an object at a particular location) and is also able to provide the obtained information to another device or network node.

For example, this disclosure describes a system that allows for a requesting user to request updates from responding devices outside of the requesting user's control for purposes of improving spatial maps. The process may occur statically (e.g., a one-time only update) as well as dynamically (e.g., continuous updates) to satisfy different use cases. Privacy techniques are provided so that the responding device selects what information it will share, and the requesting user is able to choose what information the requesting user will accept. The system allows for specificity in the type of information requested—e.g., a requesting user may not need live video of an entire area, but a specific property about a specific object (e.g., what is the angle of a ramp).

The system also allows a responding device (which, in some embodiments, may be an XR user device, described below) to generate data as well as share previously recorded data. The generated data may include point clouds and/or other data types (e.g., audio, haptics, sensory intensity, etc.). The system also may be used to support spatial mapping for mobile devices (e.g., drones or autonomous vehicles) to route plan beyond their current line of sight. Fleets of drones or autonomous vehicles can form mesh networks to continuously dynamically share spatial map data for purposes of creating a unified and continuously updated spatial map.

Although discussed in greater detail below, a requesting user may define a request for object information for a location (e.g. semantic understanding data for an object at a certain location) from a responding device. This request for object information is referred to herein as an "object map request." An object map request is a collection of information and may contain one or more of: a location identifier identifying a location for which the requesting user requests data, object type information specifying an object type, the purpose for which the object information is requested, the type(s) of data requested (e.g., visual, audio, sensory, etc.), and the relevant policy settings set by the requesting user. In one embodiment, an object map request may be in the form of data structure that is referred to herein as an Augmented LocationAreaID (ALAID) and which is defined below.

The requesting user uses a requesting device (which, in some embodiments, may be an XR user device or an XR rendering device) to transmit an object map request, which, in one embodiment is received by a network node (which, in some embodiments, may be an XR rendering device, described below). After receiving the object map request, the network node may "embed" the object map request in a spatial map (e.g., the network node may use a database or other data structure to link the object map request to a spatial map and/or the network node may include the object map request in the spatial map). In some embodiments, when a responding device requests from the network node a spatial map in which an object map request is embedded, the network node transmits to the responding device the spatial map and any object map requests embedded in the spatial map. In some embodiments, prior to transmitting an object map request to the responding device, the network node evaluates one or both of the following policy settings: a policy setting associated with the responding device or a policy setting associated with the object map request, in order to determine whether the responding device is authorized to respond to the object map request.

A responding user (i.e., a user of the responding device) may define the object map request purposes to which they will allow their responding devices to contribute data. Example parameters include the purpose for which data is requested, the maximum time duration data may be retained, and the breadth with which the data will be shared. A responding device may receive an object map request when accessing a particular spatial map upon entering a new environment (e.g., one or more object map requests may be embedded in the particular spatial map). An illustrative example is when the responding device enters a new environment, such as a different room or building, and receives a spatial map for the new environment and an object map request that is embedded in the spatial map. In one embodiment, the responding device then uses its policy setting (e.g., privacy preferences) and how those intersect with the object map request to determine whether to share the requested data. If the responding device determines to share the requested data, the responding device obtains the requested data (e.g., using a sensor, such as a camera, that is part of the responding device or connected to the responding device), and, in one embodiment provides the obtained data to the network node from which it obtained the object map request.

In some embodiments, the network node then processes the data shared by the responding device (e.g., the network node creates a point cloud based on the data shared by the responding device or extracts the relevant information from the data). In one embodiment, the network node updates a spatial map based on the data shared by the responding device (e.g., add the point cloud to the spatial map), but this is not a requirement. The resulting update to the spatial map, based upon the data shared by the responding device, is then made available to the requesting device. Alternatively, the data shared by the responding device may be sent directly to the requesting device or sent to the requesting device via another service (e.g., a service that does not use spatial maps). Although it is possible for the responding device to process data locally—and the architecture here does not foreclose upon this—an embodiment wherein a major part of the data processing is performed in a network node involves less power consumption at the responding device, where power may be restricted due to a limited battery life.

FIG. 1 illustrates some components of an extended reality (XR) system 100 according to some embodiments. As shown in FIG. 1, XR system 100 includes an XR user device 101 and an XR rendering device 124. In the example shown in FIG. 1, XR rendering device 124 is located remotely from XR user device 101 (e.g., XR rendering device 124 may be a component of a base station (e.g., a 4G base station, a 5G NR base station, a wireless local area network (WLAN) access point, etc.) or other node in a radio access network (RAN)), but in other embodiments the XR rendering device 124 may be a component of XR user device 101. The XR rendering device 124 may for example be a part of the 5G baseband unit or virtualized baseband function of a 5G base station or any future base station. Accordingly, in this embodiment, XR user device 101 and XR rendering device 124 have or are connected to communication means (transmitter, receiver) for enabling XR rendering device 124 to transmit XR content to XR user device 101 and to receive input from XR user device 101 (e.g., input from sensing units 221 and 222, described below).

Any protocol may be used to transmit XR content to XR user device 101. For instance, video and/or audio XR content may be transmitted to XR user device 101 using, for example, Dynamic Adaptive Streaming over the Hypertext Transfer Protocol (DASH), Apple Inc.'s HTTP Live Streaming (HLS) protocol, or any other audio/video streaming protocol. As another example, non-audio and non-video XR content (e.g., instructions, metadata, etc.) may be transmitted from XR rendering device 124 to XR user device 101 using, for example, HTTP or a proprietary application layer protocol running over TCP or UDP. For instance, the XR user device 101 may transmit an HTTP GET request to XR rendering device 124, which then triggers XR rendering device 124 to transmit an HTTP response. The body of this response may be an extensible markup language (XML) document or a Javascript Object Notation (JSON) document. In such an embodiment, XR rendering device 124 may be an edge-cloud device and XR rendering device 124 and XR user device 101 may communicate via a 5G NR network, which has very low latency, as described above. In other embodiments XR rendering device 124 may be a component of XR user device 101 (e.g., XR rendering device 124 may be a component of an XR headset 120). Rendering can occur either on device or the edgecloud, as determined by embodiment.

In the embodiment shown in FIG. 1, XR user device 101 includes: XR headset 120 (e.g., XR goggles, XR glasses, XR head mounted display (HMD), etc.) that is configured to be worn by a user and that is operable to display to the user an XR scene (e.g., an VR scene in which the user is virtually immersed or an AR overlay), speakers 134 and 135 for producing sound for the user, and one or more input devices (e.g., joystick, keyboard, touchscreen, etc.), such as input device 150 for receiving input from the user (in this example the input device 150 is in the form of a joystick). Each device will have some configuration settings, some determined by the type of device and input connections available (configuration settings 171) and some by the user (user preferences 172). In some embodiments, XR user device 101 includes other sensory actuators, such as an XR glove, an XR vest, and/or an XR bodysuit that can be worn by the user, as is known in the art. As used herein the phrase "worn by the user" is a broad term that encompasses not only items that are placed on the person's body (e.g., a glove, a vest, a suit, goggles, etc.), but items also implanted within the person's body.

Figure 2:
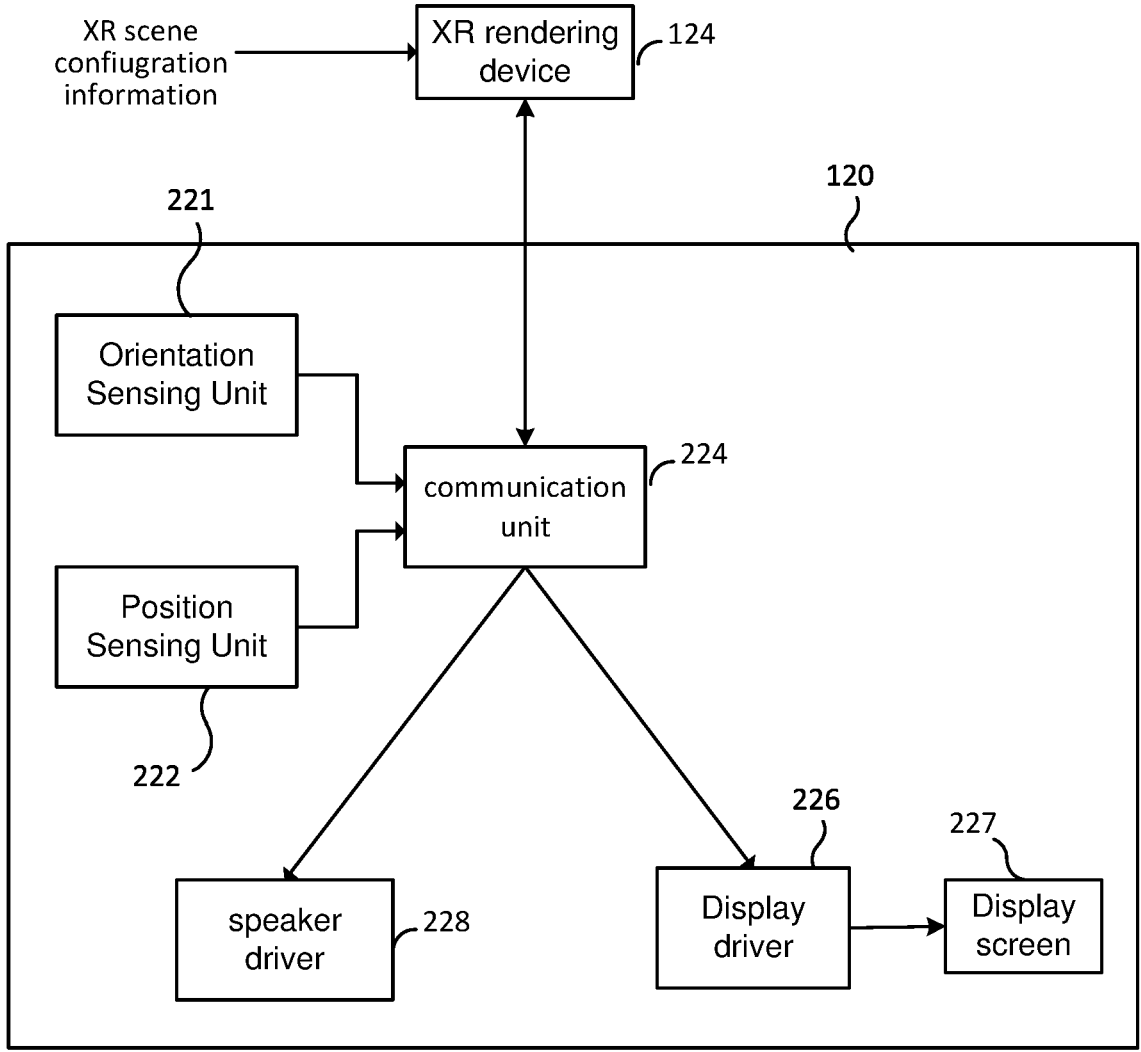
FIG. 2 illustrates an XR headset according to an embodiment.

FIG. 2 illustrates XR headset 120 according to an embodiment. In the embodiment shown, XR headset 120 includes an orientation sensing unit 221, a position sensing unit 222, and a communication unit 224 for sending data to and receiving data from XR rendering device 124. XR headset 120 may further include a neuro-muscular connectivity overlay device NCOD 299, which is described in PCT/SE2020/051258, filed on Dec. 22, 2020. Orientation sensing unit 221 is configured to detect a change in the orientation of the user and provides information regarding the detected change to XR rendering device 124. In some embodiments, XR rendering device 124 determines the absolute orientation (in relation to some coordinate system) given the detected change in orientation detected by orientation sensing unit 221. In some embodiments, orientation sensing unit 221 may comprise one or more accelerometers and/or one or more gyroscopes.

In addition to receiving data from sensing units 221 and 222, XR rendering device 124 may also receive input from input device 150 and may also obtain XR scene configuration information (e.g., XR rending device may query a database 171 for XR scene configuration information). Based on these inputs and the XR scene configuration information, XR rendering device 124 renders an XR scene in real-time for the user. That is, in real-time, XR rendering device 124 produces XR content, including, for example, video data that is provided to a display driver 126 so that display driver 126 will display on a display screen 127 images included in the XR scene and audio data that is provided to speaker driver 128 so that speaker driver 128 will play audio for the using speakers 134 and 135. The term "XR content" is defined broadly to mean any data that can be translated by an XR user device into a perceivable sensation experienced by the user. Accordingly, examples of XR content include not only video data and audio data, but also commands for instructing a sensory actuator to produce a sensory input (e.g., smell, touch) for the user.

Examples of protocols through which an XR user device can request access to spatial maps include the Hypertext Transfer Protocol (HTTP), but the embodiments are not limited to any particular protocol. In one embodiment, when a user with an XR user device enters a new environment—be that a room, a facility, a neighborhood, or a country—the spatial map of the previous environment will be replaced with a spatial map describing the new environment. As described above, an object map request may be embedded in the spatial map, in which case the XR user device receives the object map request.

1. Static Network Flow

This section introduces a static architecture and flow for object map requests. A static object map request is one in response to which data (e.g., semantic understanding data) is shared once and not updated in real time. This is in contrast to dynamic object map requests, in response to which data is transmitted repeatedly between responding and requesting devices via a network. Examples of data in a static scenario include information on the presence of ramps, curb cutouts, or stairs within a facility. For instance, one could consider a scenario in which the existing public spatial map does not include accessibility information and a requesting user would like a one-time update that includes the accessibility information in order to determine if the requesting user could successfully navigate a space.

Figure 3:
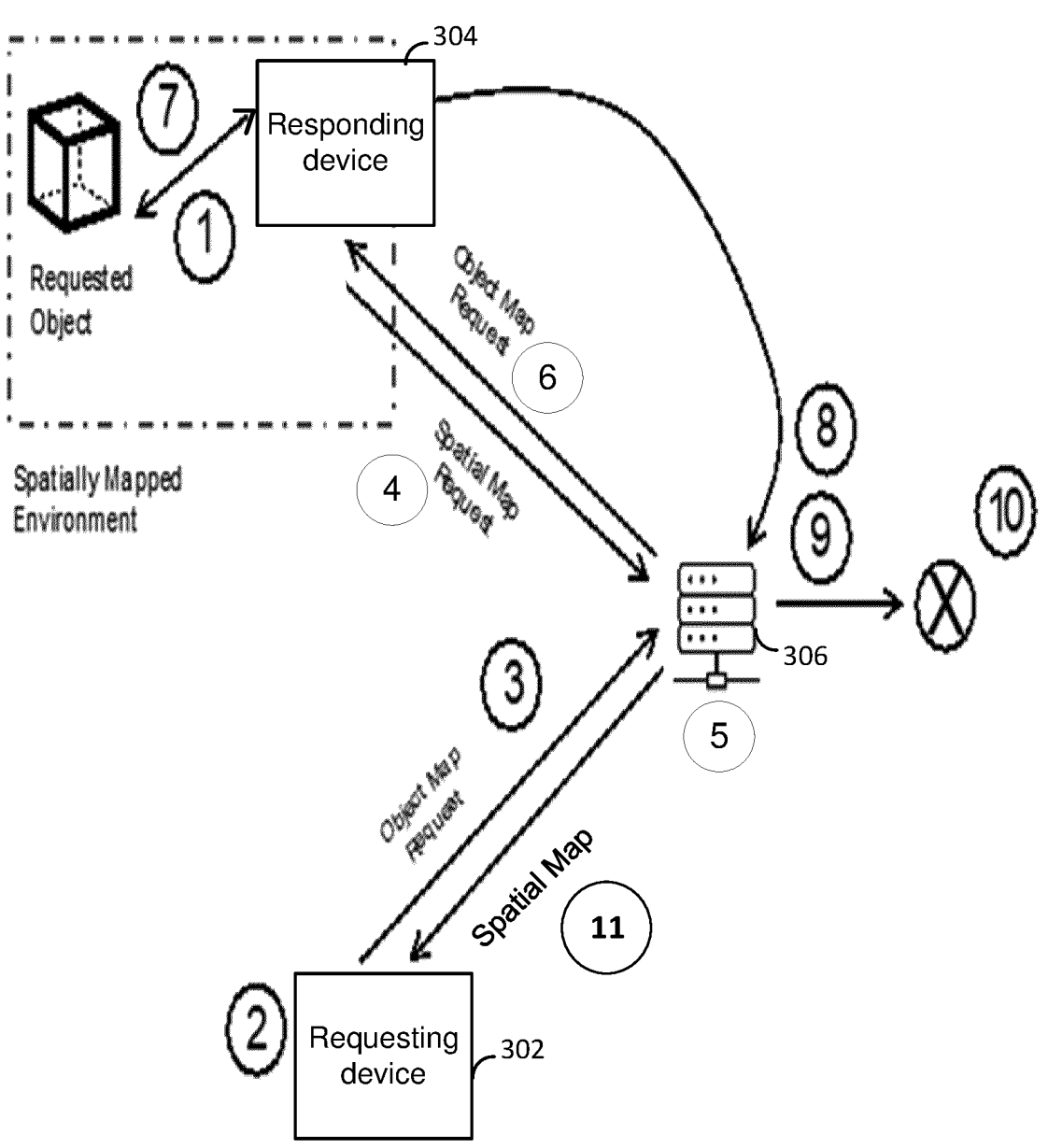
FIG. 3 is a network flow diagram illustrating a static scenario according to an embodiment.

FIG. 3 is a network flow diagram illustrating a static scenario according to one example embodiment. Note that this network flow is not limited to one requesting device 302 and one responding device 304; the request may be processed by multiple different responding devices. Requesting device 302 and/or responding device 304 may be an XR device, such as XR user device 120 or XR rending device 124 shown in FIG. 1.

In step (1), a user of responding device 304 specifies by policy the set of object map requests to which the user is willing to respond. In step (2), the object map request process is initiated in that the requesting user specifies the object information for a location the requesting user would like to obtain. An object map request including information that specifies the requested object information is communicated from the requesting device 302 to a network node 306 in step (3) (as noted above, the object map request may be in the form of an ALAID and the network node may be an XR rendering device). In this example, network node 306 embeds the object map request in a spatial map. Also, in this example, the responding device 304 is in communication with network node 306 so that responding device 304 can transmit to network node 306 a spatial map request, in step (4), for the spatial map, but this is not a requirement.

In step (5), network node 306 retrieves the spatial map and embedded object map request and determines whether responding device 304 is authorized to provide the information requested by the object map request. For example, in step (5) network node 306 determines: (A) if the policy set in step (1) indicates that responding device 304 is authorized to respond to the object map request and (B) if policy information included in the object map request (or otherwise associated with the object map request) indicates that the requesting user authorizes responding device 304 to respond to the object map request (i.e., determines whether the requesting user is willing to receive object information from responding device 304). Accordingly, in some embodiments, the transmission of the object map request to the responding device 304 will not occur if either the permissions set by policy in step (1) do not allow for a response from the responding device or if the preference information included in the object map request (or otherwise associated with the object map request) indicate that the requesting user does not want to receive information from responding device 304.

In step (6), network node 306 transmits the object map request to the responding device 304 (but in some embodiments, as shown in FIG. 3, network node also transmits the requested spatial map to responding device 304). After receiving the object map request, in step (7) the responding device 304 then collects information pertaining to the location identified in the object map request (e.g., images of the identified location or a point cloud). The information collected by responding device 304 (e.g., images or point cloud), or information derived from the collected information (e.g., a reduced point-cloud or a point cloud generated based on images collected by the responding device), is transmitted to network node 306 in step (8).

In step (9), network node 306 processes the returned information (e.g., point cloud or images). In step (10), network node 306 discards any information contained in the information that is not relevant to the specific object map request (e.g. the point clouds for any other objects in the field of view not specified in the request), thereby producing the requested object information. In step (11), the requested object information is transmitted to the requesting device 302. The requested object information transmitted to requesting device 302 may be an update to a spatial map (spatial map update) that was previously transmitted to requesting device 302 and stored in requesting device 302.

2. Dynamic Network Flow

This section introduces a dynamic architecture and flow for object map requests. A dynamic object map request is one in response to which data is repeatedly updated (e.g., updated in real time). Examples of dynamic situations include large crowds, areas under construction, and public events, where a single update is unlikely to be sufficient to provide the information desired.

Figure 4:
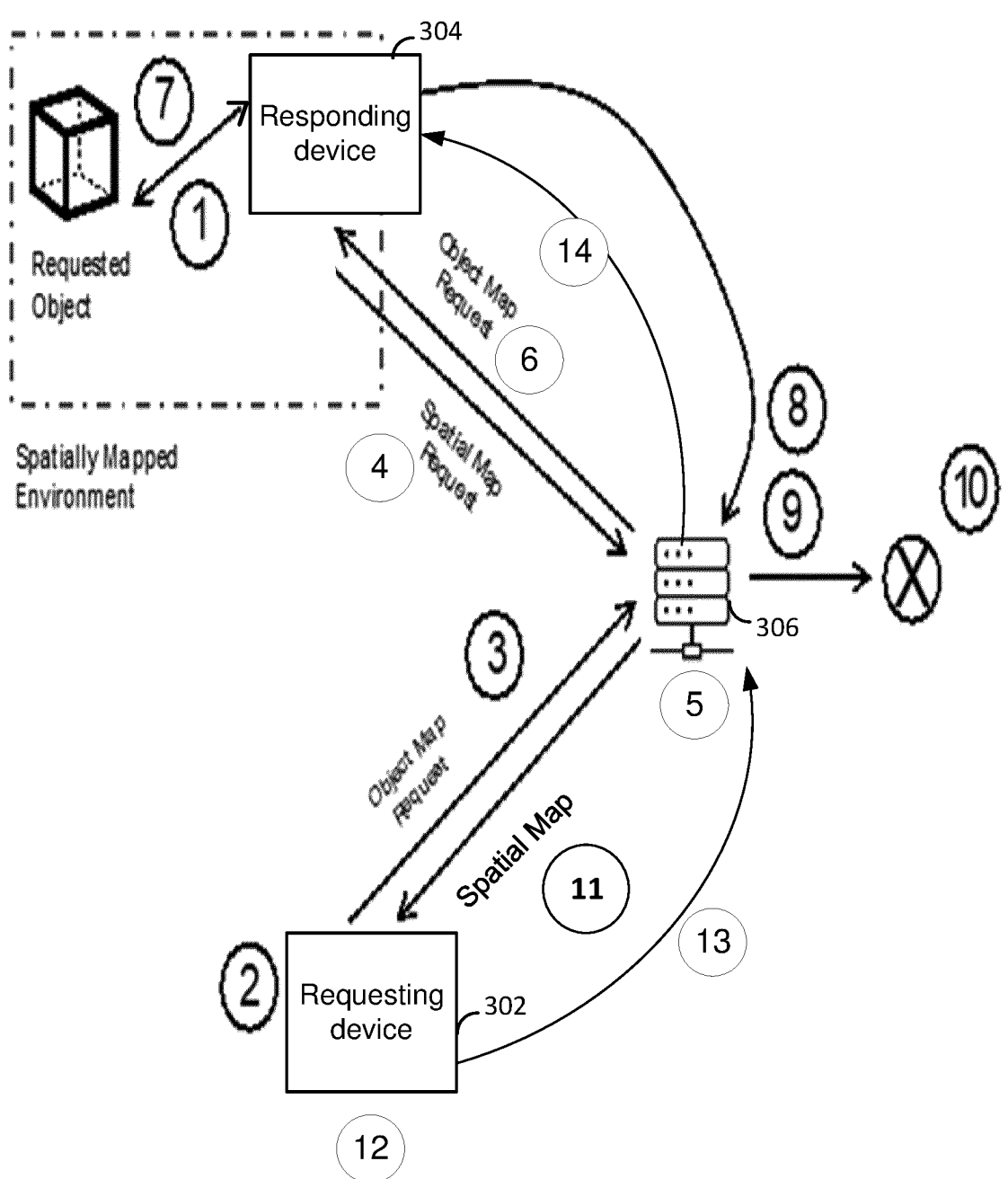
FIG. 4 is a network flow diagram illustrating a dynamic scenario according to an embodiment.

FIG. 4 is a network flow diagram illustrating a dynamic object map request process. Steps (1)-(11) are the same as the steps (1)-(11) described above with respect to FIG. 3, with the exception that, in some embodiments, the object map request includes an indicator indicating that the object map request is a dynamic map request. In some embodiments, in addition to the indicator there is a time-duration value indicating a maximum duration for the process. Until the dynamic object map request process terminates, steps 7-11 are repeatedly performed. In step (12), the requesting device 302 decides whether or not to terminate the process. For example, requesting device 302 may decide to terminate the process if the requested updates are no longer needed or, as another example, the requesting device 302 is running low on resources (e.g., memory or battery resources). If requesting device 302 decides to terminate the process, then, in step 13, the requesting device transmits a termination message to network 306, which, in step 14 transmits a termination message to responding device 304 to trigger responding device 304 to refrain from sending further updates. In some embodiments, when network node receives the object map request and the object map request specifies a maximum time-duration for the process, network node 306 sets a timer to expire when the time-duration has elapsed and this expiration of the timer triggers network node to transmit the termination message to responding device 304.

3. Levels of Trust.

The user of a responding device may choose, in a policy setting, what object map requests they will satisfy and other preferences. For example, the user may choose to satisfy only object map requests originating from certain people (e.g., the user's social network friends) or only object map requests that request a certain type of information (e.g., accessibility related information). This is shown in the network diagrams of FIGS. 3 and 4 as step (1). Similarly, a user of a requesting device may specify, in a policy setting, from which responding users and/or which responding devices they will accept responses to object map requests. Such policy settings, relating to user preferences for XR devices acting as a requesting device and/or a responding device, determine how different devices interact in order to update either common-access spatial maps (e.g., one available to all people in a location) or end user-specific maps (e.g., private only to the requesting user or people with whom they have chosen to share their map). Depending upon configuration, these policy settings can be associated with a requesting/responding user's system account (e.g., their operating system username), their device's unique identifier (e.g., International Mobile Equipment Identifier (IMEI)), or their application-specific identifier (e.g., their account name).

In some embodiments, the requesting device includes the user's policy setting in the object map request. Additionally, in some embodiments, an object map request includes information about an intended purpose of the request, an intended storage (e.g., public or private), an acceptable trust level for responses, and a time duration (for storage, dynamic connections, etc.). A user of a requesting device need not specify these parameters each time they request a spatial map; they can be set as defaults within the device's operating system, or in the application and service used to request an updated spatial map.

For responding devices, the interaction between object map requests and policy settings is made more complex by the fact that devices may share spatial map data through a variety of embodiments. In the first, a responding device may continuously stream spatial map data to network node 306 for processing. A user may set a policy in their operating system that declines the use of any streamed data to respond to spatial map requests, or set persistent and universal parameters that determine the conditions in which data may be shared. In the second, a responding device may share data via applications or services launched for this purpose. In one embodiment, a user of an XR user device can set their preferences in relation to the user device operating as a responding device at the application level or the service level.

Regardless of embodiment choice, the policy information is shared with network node 306 so that matchmaking between requesting and responding devices respects users' policy settings (e.g., privacy preferences).

There may be additional privacy parameters, such as parameters related to biometric or sensory data requested through the architecture presented herein. Although a variety of privacy-related parameters are illustrated herein, these parameters are intended to be illustrative and not exhaustive.

3.1. Requesting Device

A requesting device will, in one embodiment, specify, via a policy setting, from which responding devices it will accept a response to an object map request. Setting such a policy can be important because there exists risks of bad data quality and even malicious actors responding to object map requests. Requesting users may have preferences on what information they receive and how it is further shared beyond the requesting user. The requesting device may also specify for how long the information will be stored: many object map requests do not involve permanent changes to a user's spatial map, but rather transient information about current conditions.

3.2. Responding Device.

A user has the ability to preset, in a policy setting, their preferences for sharing information. This may include sharing or not sharing by default, or a prompt to ask the user about each object map request. This policy setting may be set before any object map requests are processed. Indeed, in some embodiments, an object map request cannot be processed by a responding device until the responding user creates a policy setting. In some embodiments, policy settings include: the request purposes that the responding user is willing to consider, the maximum level to which the responding user is willing to share information, how long the responding user is willing to have information stored, and how such stored information is to be shared, or the types of requests they are willing to consider. A policy setting of the requesting device is matched with the policy of a responding device when a requesting device is making an object map request. For example, when a responding device receives an object map request comprising a policy setting set by the requesting user, the responding device, in some embodiments, compares information in the requesting user's policy setting with corresponding information in the responding user's policy setting to determine whether the policy settings are compatible such that the responding device may respond to the object map request. For instance, the requesting user's policy setting may identify "Purpose A" as the purpose for the object map request and the responding device will then check to see whether Purpose A is included in the set of allowed purposes in the responding user's policy setting. If Purpose A is included in the set of allowed purposes, then the responding device will ignore the object map request.

4. Data Processing, Storage, and Sharing.

4.1 Data Processing

As is standard with most spatial compute architectures with device-network split, the processing to identify objects, scenes, and other features of the environment does not need to be performed on an XR user device. Machine learning is computationally intense, and continuously processing data will drain batteries. Instead, user devices share point cloud data that is then processed in network node 306. Point clouds are data points in three-dimensional space that represent the objects in field of view. The term "point cloud" is used here generally to refer to unprocessed data related to objects in the environment. This term also includes refinements and optimizations, such as plane clouds.

While the system disclosed herein allows user devices to process point cloud data locally, the most likely embodiment will be for the responding device to share unprocessed point cloud data with the network node 306. This data will then be processed in network node 306 to identify a requested object(s) and other semantic information. Points unrelated to the request object may be purged from network node 306 environment after analysis to preserve privacy. Furthermore, depending upon local laws, network node 306 can ignore or purge point cloud data during processing or storage. Examples of data that may not be used include those from minors or faces. Algorithms to identify objects, semantic information, and three-dimensional reconstruction from point cloud data is well known.

4.2. Data Storage

An object map request may specify the maximum time the requesting user will be able to access updated spatial map information. This builds upon the insight that spatial maps contain potentially proprietary information or information without any future value. As a first example, information about a retail facility's configuration and layout may give competitors insight into their strategy. As a second example, information about the relative crowding in a location will rapidly become outdated. Furthermore, storage is finite a resource and spatial maps are very large files. Requesting users may set, e.g. in a response policy or on a per object map request basis, duration limits in object map requests in order to maintain storage.

In one embodiment, the responding device determines whether or not to respond to an object map request based on the policy setting set by the user of the responding device. In another embodiment, a decision on whether or not to send an object map request to a responding device is taken by the network node 306 based on the policy setting set by the responding user and the policy setting set by the requesting user. In the latter embodiment, the policy settings are advantageously stored in the network node.

A maximum time duration specified in an object map request can be used to determine how long the data will be retained. Once the maximum duration is exceeded, the data are purged from the edgecloud. Nothing in this section forecloses on setting a maximum time duration of infinity, whereby the update becomes a permanent feature of the spatial map.

4.3. Data Sharing

An object map request may specify if the resulting spatial map update will be stored in the requesting user's proprietary spatial map or shared. Examples of sharing include with friends and family or even integrating the update into publicly available spatial maps. In one embodiment, an object map request specifies a maximum sharing level (e.g., the widest possible distribution for an update). This parameter of maximum sharing included in an object map request allows responding devices to determine whether to share information in response to an object map request, based upon a policy setting set by the user of the responding device. In this embodiment, network node 306 does not allow requesting devices to share received information more widely than what is specified in the object map request.

Depending upon the setting of the maximum sharing parameter, updated spatial maps can for example be automatically made available pushed from the requesting device to other users' proprietary spatial maps, made available in network node 306 for request such that any user that request the spatial map will receive the updated spatial map; or retained in the requesting user's private data enclave for the maximum time duration.

5. Requests

Some embodiments disclosed herein require that a requesting user has the ability to select particular locations, objects, and/or features of an environment within a spatial map and request third parties, e.g. other XR user devices, to update the information pertaining to that location. In one embodiments, a requesting user is able to (1) select a location (e.g., a three-dimensional space) for which they require new data; (2) define the location using a location identifier; and/or (3) share an object map request with responding devices located near the selected location.

5.1. Object map requests

Requesting an update to a spatial map may require a requesting user to be able to select a location (e.g., a three-dimensional area) for which the requesting user requires updated data. In some embodiments, the requesting user is able to select a location using XR masking in screen space, pre-set options in restaurant and business-finding applications such as Yelp, or tools in mapping applications such as Google Maps.

In one embodiment, a "LocationAreaID" is used to define a three-dimensional location. A LocationAreaID can for example define a cube or other three-dimensional shape. In one embodiment, the LocationAreaID includes information specifying a bottom left latitude, longitude, and altitude (for example expressed in meters) and a top right latitude, longitude, and altitude LocationAreaIDs can be used to subdivide space into three-dimensional units for purposes of defining locations.

Figure 5:
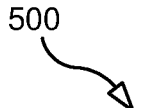
FIG. 5 illustrates an object map request according to an embodiment.

As the embodiments allow requesting users to request information as well as updated data pertaining to specific objects or features in the environment, a LocationAreaID is by itself insufficient to implement an object map request. Accordingly, in one embodiment, an object map request can be in the form of an Augmented LocationAreaID (ALAID), an example of which is illustrated in FIG. 5. This figure shows the information contained in an object map request 500 that is in the form of an ALAID.

As shown in FIG. 5, in one embodiment, object map request 500 comprises: (1) an LAID; (2) an object type ID specifying the type of object for which the requesting user has requested information; (3) a location type ID (e.g., a value specifying if the location identified by the LAID is public or private (e.g., inside of a private residence); (4) information type ID specifying the type(s) of information requested (e.g. point clouds, audio, or other types of sensor information). Each ID may be an integer or a list of integers and a look-up table is used to map the integer to a string that contains semantic information. For example, an Object type ID of 1 may be mapped to the sting "table," an a location type ID of 0 may be mapped to the string "public." In another embodiment, each ID may be a string that contains semantic information (e.g., "table," "lamp," "private," "audio," etc.).

In addition to items (1)-(4), object map request 500 may include a policy setting in the form of the following information elements: (5) response privacy settings, which contains device type information indicative of the type(s) of responding devices from which the requesting user will accept a response (e.g. all devices, a pre-defined list of trusted devices, devices operated by friends, devices operated by family members, etc.); (6), a sharing setting, which contains information specifying a maximum level to which the requesting user will share the resulting information (if it will be added to a public map, or simply retained for the user) and/or how information will be shared; (7) storage time information indicative of the time duration for which the resulting information will be stored; and (8) purpose information indicative of a purpose of the resulting information (e.g. accessibility);

In other embodiments of the ALAID, some of the above information may be omitted, and/or other types of information may be included.

5.2. Matching Object Map Requests With Responding Devices

As described above with respect to step (5) of FIG. 3 and FIG. 4, network node 306, in some embodiments, uses a policy setting included in, or otherwise associated with, an object map request (e.g., information elements (5)-(8) shown in FIG. 5 and described above) to match the object map requests with responding devices in the vicinity of the location for which data is required (i.e., the location identified by the LAID included in the object map request). In one embodiment, a policy setting is associated with the object map request when a profile for the user of the requesting device that transmitted the object map request contains a policy setting and that profile is accessible to the network node (e.g., the profile may be stored in the network node).

For example, network node 306 may communicate with a responding device at or near the location to obtain the policy setting for the responding device (assuming that network node 306 does not already have direct access to the policy setting). After obtaining the policy setting for the responding device, network node 306, based on the policy setting included in the object map request (and/or a policy setting associated with the object map request) and the obtained policy settings for the responding device, determines: (A) if the policy setting for the responding device indicates that the responding device is authorized or prohibited to respond to the object map request and (B) if the policy setting included in the object map request (or otherwise associated with the object map request) indicates that the requesting user authorizes or prohibits the responding device from responding to the object map request (i.e., determines whether the requesting user is willing to receive information from the responding device).

Assuming that the policy settings do not prohibit the responding device from responding to the object map request, then network node 306 provides the object map request to the responding device.

6. Connection to Third-Party Resources.

Point clouds can be very large files. Accordingly, even the most altruistic responding user may cease their altruism if they use the entirety of their month's data plan when responding to a dynamic object map request. In this section, an embodiment of the architecture described in relation to FIGS. 3 and 4 is introduced. In this embodiment, the requesting device 302, the responding device 304, and/or network node 306 of FIG. 3 or 4 are able to communicate with third-party resource 699 (see FIG. 6) through an application programming interface (API). This allows for third-parties to for example offer incentives to responding users, or charge requesting users, when an object map request has been successfully completed.

Examples of such incentives may include monetary payment for high quality point cloud data, rewards for sharing data publicly (as opposed to privately), or integrating requests into mobile network operators (MNOs) business support systems (BSS) such that data is not deducted from the user's account.

Figure 6:
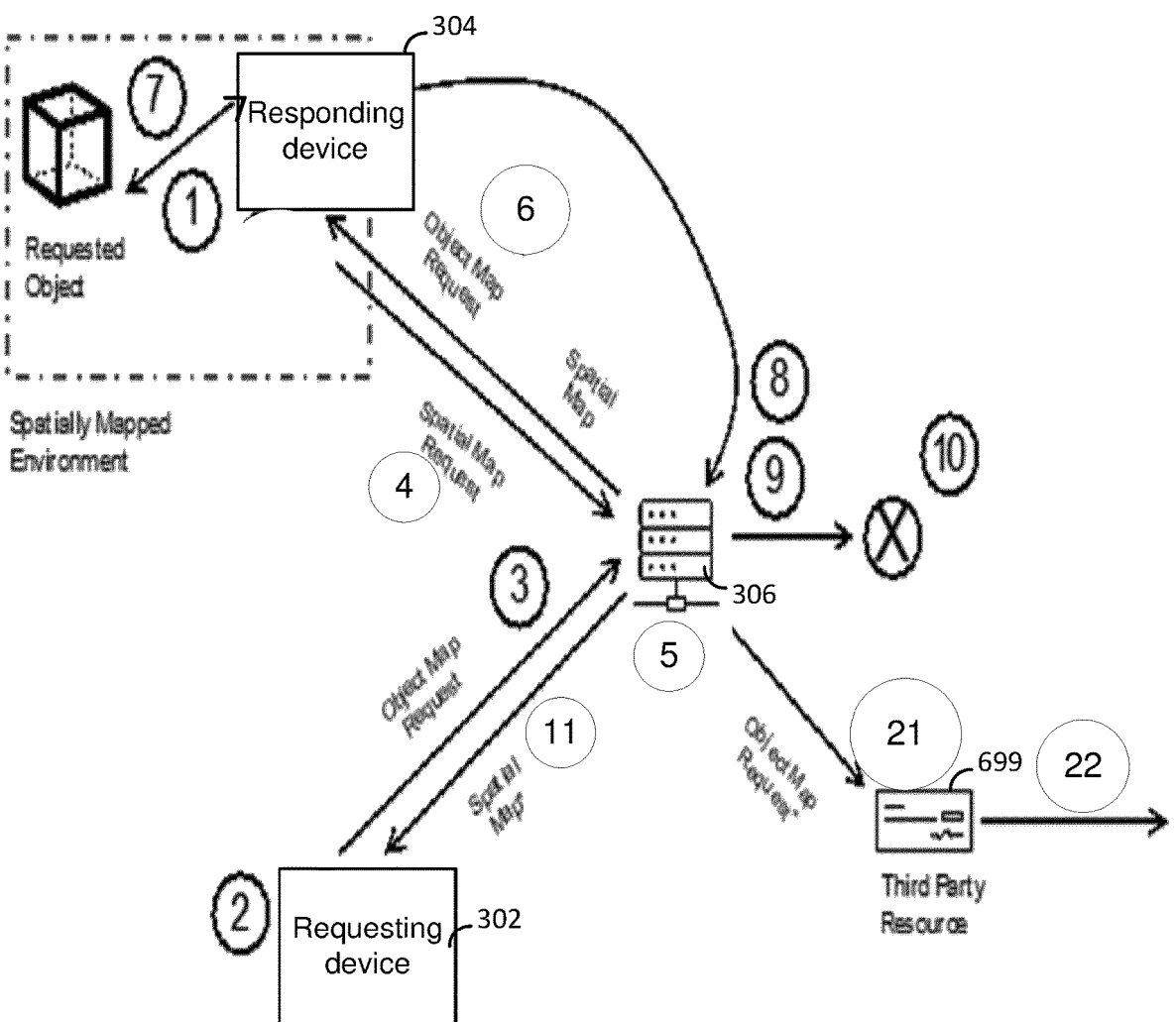
FIG. 6 illustrates an example use case.

FIG. 6 is a network flow diagram that illustrates network node 306 communicating with third-party resource 699. The process is the same as the static network flow (see FIG. 3), with the addition that, in step (21) network node 306 shares the object map request with third-party resource 699. More specifically, in this embodiment, the object map request sent to the third party resource is an updated object map request to which network node 306 has appended information. Examples of such appended information include a unique identifier for the responding device or amount of data used. The third-party resource 699 then processes that information and shares it, such as with a Mobile Network Operators (MNO's) Business Support Service (BSS) (22).

7. Object Detection Algorithm

In some embodiments, when a responding device receives an object map request requesting information about a certain type of object (e.g., a wheel chair ramp), the responding device can use any existing algorithm for detecting objects of the specified object type (see, e.g., reference [6], which introduces a generic 3D object detection network and reference [7], which performs 3D object detection on point cloud data—these examples illustrate various techniques for object detection using point cloud data and are not exhaustive descriptions of all approaches to object detection with point cloud or volumetric data).

8. Collaborative Spatial Mapping

FIG. 7 is a flow chart illustrating a process 700, according to an embodiment, for collaborative spatial mapping. Process 700 may be performed by requesting device 302 and may begin in step s702. Step s702 comprises generating an object map request for object information for a location, the object map request comprising a location identifier (e.g., an LAID) identifying the location and object type information (e.g., the object type ID described above) specifying an object type. Step s704 comprises transmitting the object map request. Step s706 comprises receiving a response to the object map request, the response comprising object information about an identified object of the specified object type.

In some embodiments, the object map request further comprises data type information specifying a requested data type, and the received object information about the identified object has a data type matching the requested data type.

In some embodiments, the location identifier specifies a two-dimensional location on a Euclidian plane and an altitude.

In some embodiments, the object map request further comprises location type information specifying a location type. In some embodiments, the location type is either public or private.

In some embodiments, the object map request further comprises a policy setting comprising device type information specifying one or more specific devices and/or one or more device types from which the requesting device will accept a response to the object map request (e.g. all devices, a pre-defined list of trusted devices, devices operated by friends, devices operated by family members, etc.).

In some embodiments, the object map request further comprises maximum sharing level information specifying a maximum level at which a user of the requesting device will share the received object information.

In some embodiments, the object map request further comprises storage time information specifying how long the requesting device will retain the object information.

In some embodiments, the object map request further comprises purpose information specifying a purpose for requesting the object information.

In some embodiments, the object map request is a dynamic object map request, and the process further includes: receiving a second response message to the object map request and transmitting a message for terminating the dynamic object map request.

Figure 8:
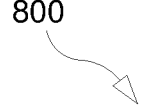
FIG. 8 is a flowchart illustrating a process according to an embodiment.

FIG. 8 is a flow chart illustrating a process 800, according to an embodiment, for collaborative spatial mapping. Process 800 may be performed by a responding device 304 and may begin in step s802. Step s802 comprises receiving, at a responding device, an object map request generated by a requesting device 302. Step s804 comprises obtaining information pertaining to a current location of the responding device. Step s806 comprises generating a response to the object map request, the response comprising the obtained information. Step s808 comprises transmitting the response to a network node (e.g., network node 306).

In some embodiments, the responding device comprises a sensor and the obtained information comprises data captured by the sensor of the responding device.

In some embodiments, the object map request comprises object type information specifying an object type and the process further includes: capturing data using a sensor of the responding device; and using the captured data, detecting an object of the specified object type, wherein obtaining the information pertaining to the location comprises generating information pertaining to the detected object of the specified object type.

In some embodiments, the sensor is a camera and the data captured by the sensor comprises one or more images.

In some embodiments, the process further includes, prior to receiving the object map request, the responding device transmitting to the network node a message comprising information indicating the current location of the responding device; and receiving from the network node a response to the message, wherein the response comprises the object map request. In some embodiments, the response further comprises map information for the current location.

In some embodiments, the object map request is a dynamic object map request, and the process further includes: obtaining further information pertaining to the identified location; generating a second response message to the object map request, the second response message comprising the further information; and transmitting the second response message to the network node.

In some embodiments, the object map request comprises a location identifier identifying a location. In some embodiments, the process further includes determining whether the responding device is within a threshold distance of the identified location.

In some embodiments, the process further includes obtaining a policy setting, the policy setting comprising one or more of: device information specifying one or more specific devices and/or one or more device types from which the responding device will accept object map requests, user information specifying one or more specific users and/or one or more user types (e.g. friends, family, colleagues) from which the responding device will accept object map requests, or purpose information specifying one more purposes and specifying that the responding device will only respond to object map requests having a purpose that matches the one or specified purposes. In some embodiments, the process further includes, prior to generating the response to the object map request, the responding device determining whether the policy setting prohibits the responding device from acting on the object map request.

FIG. 9 is a flow chart illustrating a process 900, according to an embodiment, for collaborative spatial mapping. Process 900 may be performed by network node 306 and may begin in step s902. Step s902 comprises receiving a first request message generated by a requesting device (e.g., a request message comprising an object map request), the first request message comprising a location identifier identifying a location and object type information specifying an object type. Step s904 comprises after receiving the first request message, transmitting a second request message to a responding device (e.g., a request message comprising the object map request included in the first request message or a modified version of the object map request). Step s906 comprises receiving a first response message transmitted by the responding device in response to the second request message, the first response message comprising information pertaining to the identified location obtained by the responding device. Step s908 comprises transmitting to the requesting device a second response message in response to receiving the first response message transmitted by the responding device, wherein the second response message comprises one or more of: i) the information obtained by the responding device or ii) information generated by the network node using the information obtained by the responding device.

In some embodiments, the process further includes, prior to transmitting the second request message to the responding device, receiving position information indicating a current location of the responding device; and determining whether or not to send the second request message to the responding device, wherein the determination is based at least in part on the position information indicating the current location of the responding device. A technical effect/advantage of these particular embodiments is to verify the presence of the responding device in the location, as this allows for data quality filtering and prevents malicious contributions.

In some embodiments, determining whether or not to send the second request message to the responding device comprises determining whether the responding device is within a threshold distance of the location identified by the location identifier. In some embodiments, the second request message is transmitted to the responding device as a result of determining that the responding device is within the threshold distance of the location identified by the location identifier. A technical effect/advantage of these particular embodiments is that they allow for filtering of the requests sent to responding devices to minimize data usage or responding devices sharing data that is irrelevant.

In some embodiments, the process further includes storing a policy setting associated with the responding device or a user of the responding device, wherein determining whether or not to send the second request message to the responding device further comprises, determining, based on the policy setting, whether the policy setting allows the responding to respond to the second request message, and the second request message is transmitted to the responding device as a result of determining that the responding device is within the threshold distance of the location identified by the location identifier and that the policy setting allows the responding device to respond to the second request message. A technical effect/advantage of this embodiment is that it ensures that only authorized responding devices that are within the correct location.

In some embodiments, the policy setting comprises one or more of: device information specifying one or more specific devices and/or one or more device types from which the responding device will accept object map requests, user information specifying one or more specific users and/or one or more user types from which the responding device will accept object map requests, or purpose information specifying one more purposes and specifying that the responding device will only respond to object map requests having a purpose that matches the one or specified purposes. A technical effect/advantage of this embodiment is that it gives a responding user control over which object map requests to respond to.

In some embodiments, the process further includes generating information using the information included in the first response message transmitted by the responding device, wherein the second response message comprises the generated information. For example, the information included in the first response message may comprise images obtained from a camera and the generated information that is generated based on these images may comprises one or more point clouds. A technical effect/advantage of this embodiment is that it does not consume too many processing resources of the responding device as it is the network node that produces the point clouds.

In some embodiments, the information obtained by the responding device comprises one or more images captured by a camera of the responding device, and the step of generating information using the information obtained by the responding device comprises forming a point cloud based on the one or more images. In some embodiments, the step of generating information using the information obtained by the responding device further comprises using the point cloud to detect an object within the point cloud having the specified object type and generating information about the detected object. A technical effect/advantage of this embodiment is that it does not consume too many processing resources of the responding device as it is the network node that produces the point clouds.

In some embodiments, the first request message is an object map request, the second request message is the object map request, and the process further includes retrieving map information (e.g., a spatial map) based on the current location of the responding device; and transmitting the retrieved map information (e.g., spatial map) to the responding device, wherein the retrieved map information comprises the object map request. A technical effect/advantage of this is that a responding device receiving a spatial map will also receive any object map requests that are embedded in the map information.

It should be noted that any protocol (e.g., HTTP, Transmission Control Protocol (TCP), User Datagram Protocol (UDP)) can be used to transmit any of the message disclosed herein. In one embodiment, the object map request is transmitted as an HTTP GET message from the requesting device 302 to the network node 306, as well as from the network node 306 to responding device 304. In this embodiment, the spatial map request is transmitted as an HTTP response message from the responding device 304 to the network node 306. The object map request is similarly transmitted in this embodiment as an HTTP response message from the network node 306 to the requesting device 302.

Figure 10:
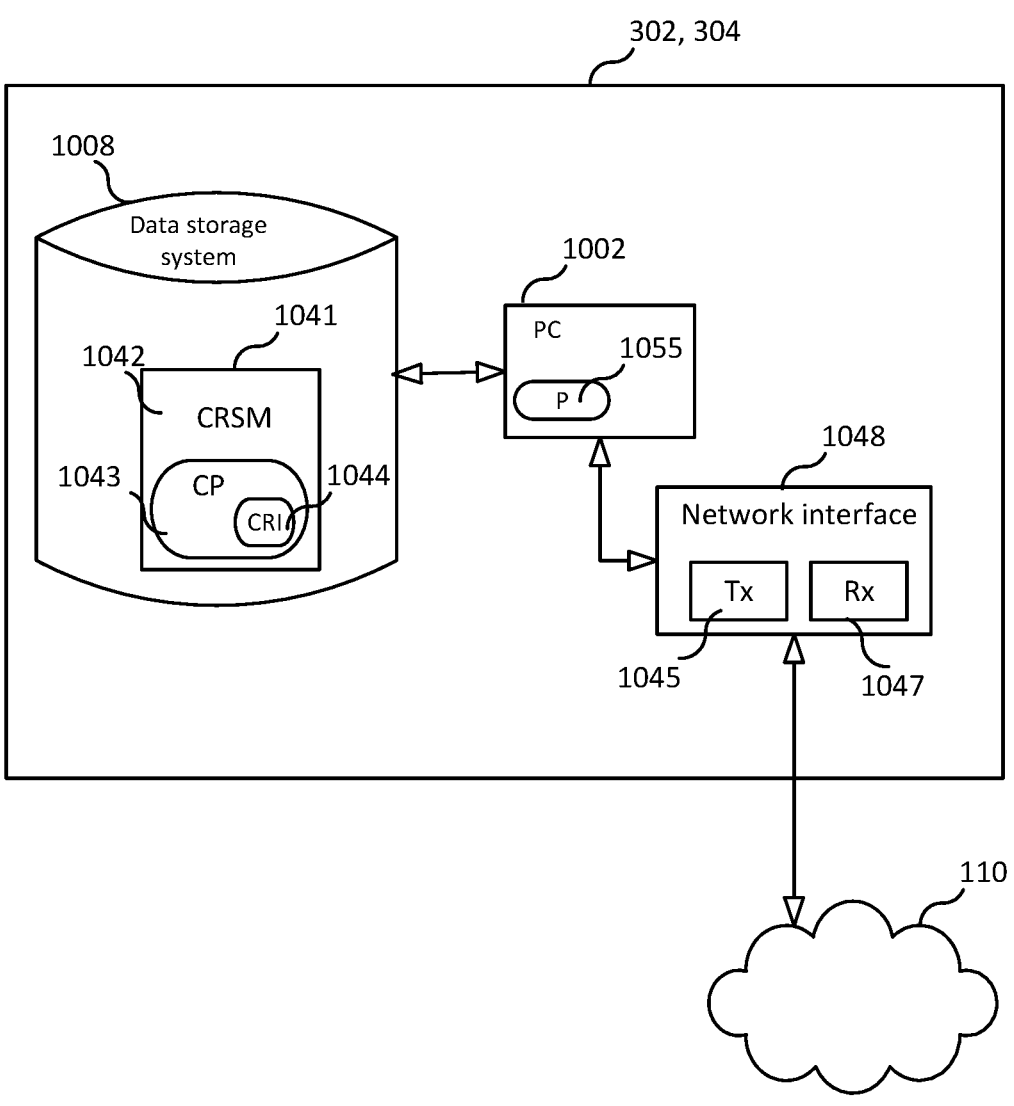
FIG. 10 illustrates an XR user device according to an embodiment.

FIG. 10 is a block diagram of a device which can either be requesting device 302 or responding device 304. As shown in FIG. 10, the device may comprise: processing circuitry (PC) 1002, which may include one or more processors (P) 1055 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., the device may be a distributed computing apparatus); at least one network interface 1048 (e.g., a physical interface or air interface) comprising a transmitter (Tx) 1045 and a receiver (Rx) 1047 for enabling the device to transmit data to and receive data from other nodes connected to a network 110 (e.g., an Internet Protocol (IP) network) to which network interface 1048 is connected (physically or wirelessly) (e.g., network interface 1048 may be coupled to an antenna arrangement comprising one or more antennas for enabling the device to wirelessly transmit/receive data); and a local storage unit (a.k.a., "data storage system") 1008, which may include one or more non-volatile storage devices and/or one or more volatile storage devices. In embodiments where PC 1002 includes a programmable processor, a computer program product (CPP) 1041 may be provided. CPP 1041 includes a computer readable storage medium (CRSM) 1042 (or computer readable medium (CRM) for short) storing a computer program (CP) 1043 comprising computer readable instructions (CRI) 1044. CRM 1042 may be a non-transitory computer readable medium, such as, magnetic media (e.g., a hard disk), optical media, memory devices (e.g., random access memory, flash memory), and the like. In some embodiments, the CRI 1044 of computer program 1043 is configured such that when executed by PC 1002, the CRI causes the device to perform steps described herein (e.g., steps described herein with reference to the flow charts of FIG. 7 and FIG. 8). In other embodiments, the device may be configured to perform steps described herein without the need for code. That is, for example, PC 1002 may consist merely of one or more ASICs. Hence, the features of the embodiments described herein may be implemented in hardware and/or software.

Figure 11:
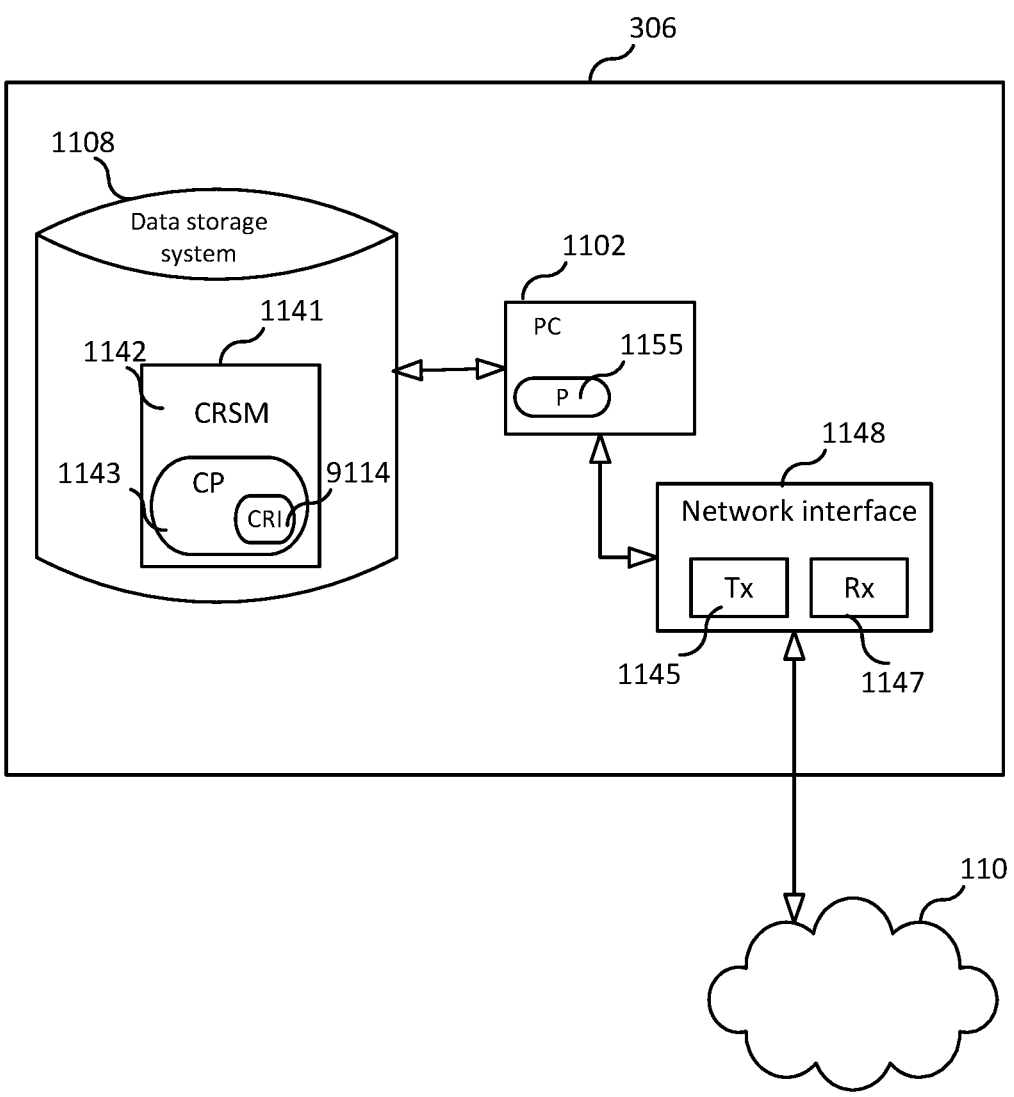
FIG. 11 illustrates a network node according to an embodiment.

FIG. 11 is a block diagram of network node 306, according to some embodiments. As shown in FIG. 11, network node 306 may comprise: processing circuitry (PC) 1102, which may include one or more processors (P) 1155 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., network node 306 may be a distributed computing apparatus); at least one network interface 1148 (e.g., a physical interface or air interface) comprising a transmitter (Tx) 1145 and a receiver (Rx) 1147 for enabling network node 306 to transmit data to and receive data from other nodes connected to a network 110 (e.g., an Internet Protocol (IP) network) to which network interface 1148 is connected (physically or wirelessly) (e.g., network interface 1148 may be coupled to an antenna arrangement comprising one or more antennas for enabling network node 306 to wirelessly transmit/receive data); and a local storage unit (a.k.a., "data storage system") 1108, which may include one or more non-volatile storage devices and/or one or more volatile storage devices. In embodiments where PC 1102 includes a programmable processor, a computer program product (CPP) 1141 may be provided. CPP 1141 includes a computer readable storage medium (CRM) 1142 storing a computer program (CP) 1143 comprising computer readable instructions (CRI) 1144. CRSM 1142 may be a non-transitory computer readable medium, such as, magnetic media (e.g., a hard disk), optical media, memory devices (e.g., random access memory, flash memory), and the like. In some embodiments, the CRI 1144 of computer program 1143 is configured such that when executed by PC 1102, the CRI causes network node 306 to perform steps described herein (e.g., steps described herein with reference to the flow chart in FIG. 9). In other embodiments, network node 306 may be configured to perform steps described herein without the need for code. That is, for example, PC 1102 may consist merely of one or more ASICs. Hence, the features of the embodiments described herein may be implemented in hardware and/or software.

CONCLUSION

While this disclosure highlights visual data (e.g., object detection and localization), the embodiments are sufficiently general to allow requesting users and responding devices to process other data types. Examples include, but are not limited to, audio, haptic, and other sensory data.

As one example, the embodiments allow requesting users to request object information related to a specific object (e.g., a ramp) in a particular location (the grocery store). For instance, a requesting user may wish to know the maximum angle of an accessibility ramp and nothing else. Additionally, the embodiments allow both the requesting user and user of a responding device to fully specify privacy and security preferences through the above described policy settings. For example, user of responding device may specify which requests their responding device will respond to and requesting user may specify the data they will accept, for which purposes data may be used, and the maximum time duration for which data may be retained. Additionally, this architecture can support the rewarding of responding devices with inducements to share data, such as data rebates or financial compensation.

There is also support for not only static requests, but also dynamic requests, wherein information pertaining to a location is repeatedly transmitted from the responding device to the network node, and wherein the requesting device repeatedly receives, from the network node, object information generated based on the information obtained from the responding device. Static requests are marked as complete once a responding headset has shared sufficient data for the network node to process and augment the end user's spatial map. This is a one-shot process and the end user's spatial map will only update again upon defining another request. By contrast, dynamic requests complete after a predefined amount of time or upon end user or responding device termination of the connection. While a dynamic request is active, updates are shared continuously such that the end user's spatial map reflects real-time conditions in the environment. Dynamic requests are used to spatially map environments that change rapidly, such as in a crowd or traffic conditions.

The architecture introduced herein supports a variety of important use cases. For instance, line-of-sight requirements limit the usefulness of autonomous vehicles and drones as well as the speed with which they may travel safely. Using the dynamic spatial map sharing, fleets of drones or autonomous vehicles could form a mesh network to constantly share spatial map data for purposes of creating a unified and continuously updated spatial map. Dynamic spatial mapping also helps support XR users with physical disabilities. Even if accessibility features (such as wheelchair ramps or the presence of strobe lights) are included in an environment's spatial map, objects may block the wheelchair ramp or the strobe lights turned off.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] Kwon S, Park J W, Moon D, Jung S, Park H. Smart merging method for hybrid point cloud data using UAV and LIDAR in earthwork construction. Procedia engineering. 2017 Jan. 1; 196:21-8.

[2] Higgins C W, Davis M E, Martinez R, O'sullivan J J, Paretti C T, Kalaboukis C, Athsani A, inventors; Altaba Inc, assignee. System and method for context enhanced mapping. U.S. Pat. No. 8,583,668. 2013 Nov. 12.

[3] Kaye, H. Stephen; Kang, Taewoon; LaPlante, Michell P (2000). "Mobility Device Use in the United States". https://eric.ed.gov/?id=ED444296

[4] Fortune Business Insights (2020). "Mobility Devices Market Size, Share and Industry Analysis By Product (Wheelchairs, Mobility Scooters, Walking Aids and Others); By End-User (Personal Users and Institutional Users); and Regional Forecast 2019-2026." https://www-.fortunebusinessinsights.com/industry-reports/mobility-devices-market-100520

[5] Ericsson ConsumerLab (2019). "10 Hot Consumer Trends 2030: The Internet of Senses." https://www.ericsson.com/4ae13b/assets/local/reports-papers/consumer-lab/reports/2019/10hctreport2030.pdf

[6] Zhou, Y. and Tuzel, O. (2018). Voxelnet: End-to-end learning for point cloud based 3d object detection. In Proceedings of the IEEE Conference on Computer Vision and Pattern Recognition (pp. 4490-4499). https://ieeexplore.ieee.org/document/8578570.

[7] Shi, S., Wang, X. and Li, H. (2019). Pointrcnn: 3d object proposal generation and detection from point cloud. In Proceedings of the IEEE Conference on Computer Vision and Pattern Recognition (pp. 770-779). https://arxiv.org/abs/1812.04244.

The invention claimed is:

1. A network node for collaborative spatial mapping, the network node being configured to:

receive a first request message generated by a requesting device, the first request message comprising a location identifier identifying a location and object type information specifying an object type;

after receiving the first request message, transmit a second request message to a responding device;

receive a first response message transmitted by the responding device in response to the second request message, the first response message comprising information pertaining to the identified location obtained by the responding device; and transmit to the requesting device a second response message in response to receiving the first response message transmitted by the responding device, wherein the second response message comprises one or more of:

i) the information obtained by the responding device or ii) information generated by the network node using the information obtained by the responding device.

2. The network node of claim 1, wherein the network node is further configured to:

prior to transmitting the second request message to the responding device, receive position information indicating a current location of the responding device; and determine whether or not to send the second request message to the responding device, wherein the determination is based at least in part on the position information indicating the current location of the responding device.

3. The network node of claim 2, wherein determining whether or not to send the second request message to the responding device comprise determining whether the responding device is within a threshold distance of the location identified by the location identifier.

4. The network node of claim 3, wherein the second request message is transmitted to the responding device as a result of determining that the responding device is within the threshold distance of the location identified by the location identifier.

5. The network node of claim 4, wherein the network node is further configured to store a policy setting associated with the responding device or a user of the responding device, wherein determining whether or not to send the second request message to the responding device further comprises, determining, based on the policy setting, whether the policy setting allows the responding to respond to the second request message, and the second request message is transmitted to the responding device as a result of determining that the responding device is within the threshold distance of the location identified by the location identifier and that the policy setting allows the responding device to respond to the second request message.

6. The network node of claim 5, wherein the policy setting comprises one or more of:

device information specifying one or more specific devices and/or one or more device types from which the responding device will accept object map requests, user information specifying one or more specific users and/or one or more user types from which the responding device will accept object map requests, or purpose information specifying one more purposes and specifying that the responding device will only respond to object map requests having a purpose that matches the one or specified purposes.

7. A non-transitory computer readable storage medium storing:

a computer program comprising instructions which when executed by processing circuitry of a requesting device causes the requesting device to:

generate an object map request for object information for a location, the object map request comprising a location identifier identifying the location and object type information specifying an object type; and transmit the object map request; and receive a response to the object map request, the response comprising object information about an identified object of the specified object type;

a computer program comprising instructions which when executed by processing circuitry of a responding device, causes the responding device to:

receive, at the responding device, an object map request generated by a requesting device, obtain information pertaining to a current location of the responding device, generate a response to the object map request, the response comprising the obtained information, and transmit the response to a network node; and a computer program comprising instructions which when executed by processing circuitry of a network node causes the network node to:

receive a first request message generated by a requesting device, the first request message comprising a location identifier identifying a location and object type information specifying an object type, after receiving the first request message, transmit a second request message to a responding device, receive a first response message transmitted by the responding device in response to the second request message, the first response message comprising information pertaining to the identified location obtained by the responding device, and transmit to the requesting device a second response message in response to receiving the first response message transmitted by the responding device, wherein the second response message comprises one or more of:

i) the information obtained by the responding device or ii) information generated by the network node using the information obtained by the responding device.

* * * * *